July 2, 1940.

H. C. BOWEN 2,206,628

AUTOMATIC ADJUSTER

Filed Feb. 8, 1939

INVENTOR.
HERBERT C. BOWEN
BY
ATTORNEY.

Patented July 2, 1940

2,206,628

UNITED STATES PATENT OFFICE 2,206,628

AUTOMATIC ADJUSTER

Herbert C. Bowen, Detroit, Mich., assignor to Hydraulic Brake Company, Detroit, Mich., a corporation of California Application February 8, 1939, Serial No. 255,351

8 Claims. (Cl. 188—79.5)

This invention relates to brakes, and more particularly to means for adjusting the friction elements of brakes.

This invention comprehends a simple and efficient means for automatically adjusting the friction elements of a conventional brake proportionately to the wear of the lining on the friction element so that when the brake is at rest the friction element may be supported in proper spaced relation to the drum.

An object of the invention is to provide an automatic adjustment for the friction element of a brake controlled by wear on the lining of the friction element.

Another object of the invention is to provide an automatic adjustment for the friction element of a brake operative to adjust the element proportionately to wear on the lining of the element.

Figure 1:
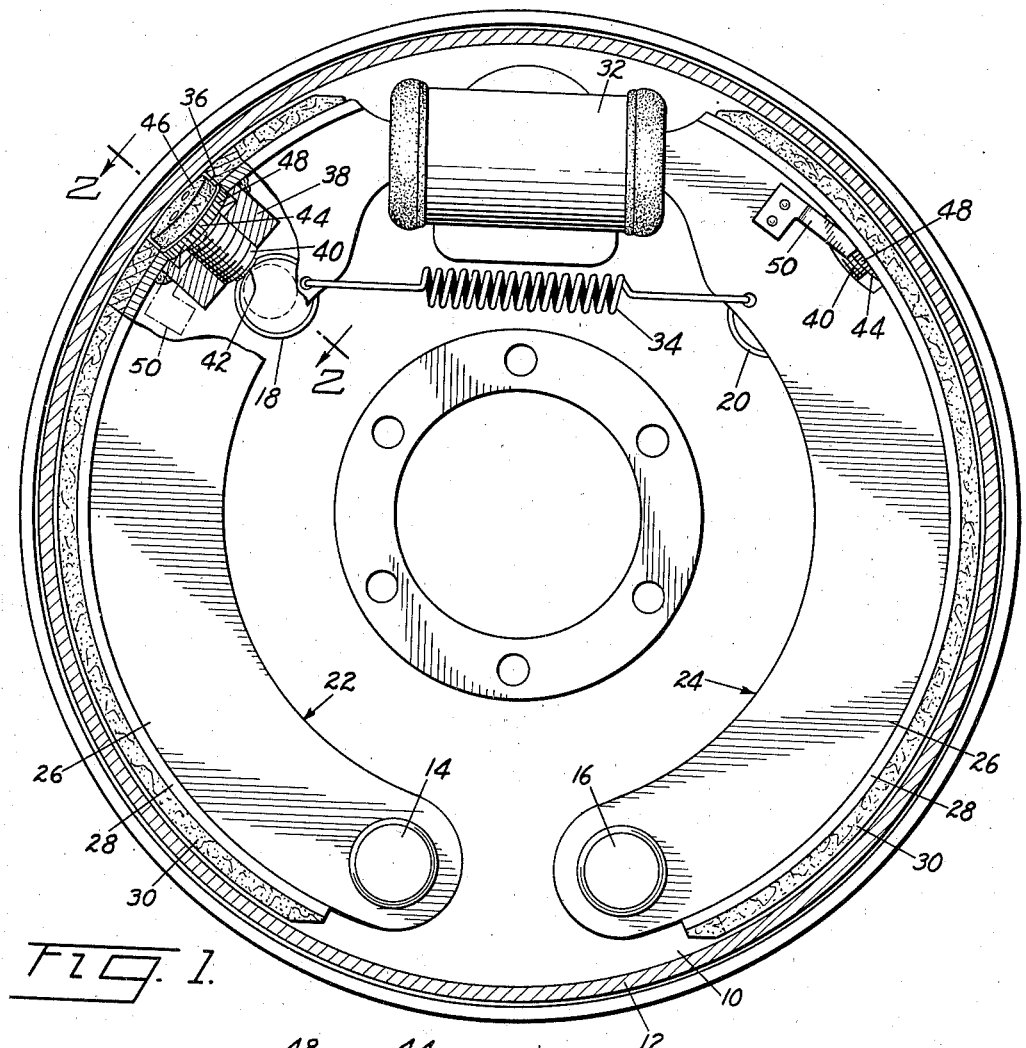
Figure 2:
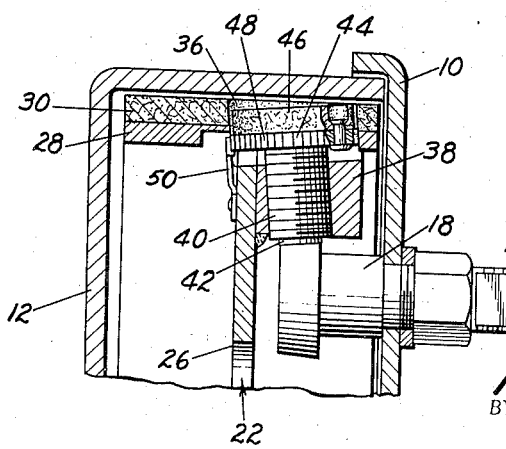

Other objects of the invention will appear from the following description taken in connection with the drawing forming a part of this specification, and in which, Fig. 1 is a vertical sectional view of a brake illustrating the invention as applied; and Fig. 2 is a sectional view substantially on line 2—2, Fig. 1.

Referring to the drawing for more specific details of the invention, 10 represents a fixed support or backing plate adapted to be secured to an axle or to an axle housing, and 12 represents a rotatable drum adapted to be secured to a wheel. The backing plate has arranged thereon a pair of spaced anchors 14 and 16 and a pair of adjustable stops 18 and 20. A pair of corresponding interchangeable friction elements or shoes 22 and 24 are pivotally mounted on the anchors 14 and 16. Each of the shoes includes a web 26 supporting a rim 28 having suitably secured thereto a friction lining 30 for cooperation with the drum.

A fluid pressure actuated motor 32 is arranged on the backing plate between the friction elements or shoes, and connected to the force applying ends thereof, and a retractile spring 34 connects the shoes adjacent their force-applying ends. The motor is operative to move the shoes into engagement with the drum against the resistance of the retractile spring.

Each friction element or shoe has adjacent its force-applying end an opening 36, and a lug 38 suitably secured to the web 26 of the shoe beneath the opening 36 is bored and tapped for the reception of a screw 40, and the axis of the bore is inclined with respect to the web of the shoe and bias of the opening 36.

The screw 40 has on one of its ends an extension 42 for cooperation with the adjustable stop 18 or 20, and on the other end of the screw is a head 44 fitted for rotation in the opening 36. The head 44 has thereon a friction lining 46 for cooperation with the drum, preferably of a lower coefficient than the lining 30 and the rim 28 of the shoe. The head 44 and the lining 46 thereon are so disposed in the opening 36 that only a small section of the lining 46 adjacent its periphery may engage the drum. This facilitates in rotation of the screw 40. The periphery of the head 44 is knurled, as indicated at 48. A spring 50 secured to the web of the shoe cooperates with the knurled surface 48 for inhibiting retrograde movement of the screw.

Under normal operating conditions, upon energization of the motor 32, the friction elements or shoes 22 and 24 are moved from their position of rest or retracted position into engagement with the drum 12 against the resistance of the retractile spring 34. This operation inherently results in wear of the friction lining 30 on the shoes, and this causes an unsatisfactory adjustment of the shoes when the shoes are returned to their retracted position.

In the instant invention, as the lining 30 on the shoes wears away, the lining 46 on the head of the screw 40 engages the drum, resulting in slight rotation of the screw and movement thereof transversely of the shoe. This movement of the screw is proportionate to the wear on the lining 30, and retrograde movement of the screw is inhibited by the spring 50 cooperating with the knurled periphery of the head. Accordingly, when the shoes are returned to their retracted position, upon conclusion of a braking operation, the extension 42 engages the stop 18 or 20 and supports the shoe in proper spaced relation to the drum.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A brake comprising a rotatable drum, a friction element associated therewith, a retractile stop therefor, and a threaded member mounted for travel on the element transversely thereof for cooperation with the drum and stop.

2. A brake comprising a rotatable drum, a friction element associated therewith, a retractile stop for the friction element, and a threaded member mounted for travel on the element transversely thereof having a part for cooperation with the drum and another part for cooperation with the stop.

3. A brake comprising a rotatable drum, a friction element for cooperation therewith, a retractile stop for the element, and a threaded member mounted for travel on the element with its respective ends arranged for cooperation with the drum and stop.

4. A brake comprising a rotatable drum, a friction element for cooperation therewith, a retractile stop associated with the element, and a screw mounted for travel on the element having a head for cooperation with the drum and an end for cooperation with the stop.

5. A brake comprising a rotatable drum, a friction element for cooperation therewith, a retractile stop associated with the element, and a screw mounted for travel on the element transversely thereof and inclined with relation thereto having a head for cooperation with the drum and an end for cooperation with the stop.

6. A brake comprising a rotatable drum, a friction element for cooperation therewith, a retractile stop associated with the element, a screw mounted for travel on the element transversely thereof and inclined with relation thereto, a head on the screw, a friction lining on the head for cooperation with the drum, and a part on the screw for cooperation with the stop.

7. A brake comprising a rotatable drum, a friction element for cooperation therewith having an opening therein, a retractile stop associated with the element, a screw mounted for travel on the element transversely thereof and inclined with relation thereto, a head on the screw received by the opening and adaptable for engagement with the drum, and a reduced end on the screw for cooperation with the stop.

8. A brake comprising a rotatable drum, a friction element for cooperation therewith having an opening therethrough, a screw mounted for travel on the element transversely thereof and in a path inclined with relation thereto, a head on the screw rotatable in the opening, a lining on the head for cooperation with the drum, the end of the screw cooperating with the stop, and means for inhibiting retrograde movement of the screw.

HERBERT C. BOWEN.